United States Patent
Anderson et al.

(10) Patent No.: US 11,346,390 B2
(45) Date of Patent: May 31, 2022

(54) TERMINATION ASSEMBLY

(71) Applicant: JDR Cable Systems Ltd., Littleport Ely (GB)

(72) Inventors: Luke Anderson, Littleport Ely (GB); Steven Wilkinson, Littleport Ely (GB); Daniel Grayson, Littleport Ely (GB); Mike Smee, Littleport Ely (GB)

(73) Assignee: JDR Cable Systems Ltd., Ely (GB)

( * ) Notice: Subject to any disclaimer, the term of this patent is extended or adjusted under 35 U.S.C. 154(b) by 0 days.

(21) Appl. No.: 16/584,031

(22) Filed: Sep. 26, 2019

(65) Prior Publication Data

US 2020/0109742 A1 Apr. 9, 2020

(30) Foreign Application Priority Data

Sep. 26, 2018 (GB) .................................... 1815721

(51) Int. Cl.

| | |
|---|---|
| *F16C 11/06* | (2006.01) |
| *B60T 11/04* | (2006.01) |
| *F16C 23/04* | (2006.01) |
| *F16D 125/58* | (2012.01) |
| *F16D 125/60* | (2012.01) |

(52) U.S. Cl.
CPC ...... *F16C 11/0614* (2013.01); *F16C 11/0671* (2013.01); *B60T 11/046* (2013.01); *F16C 11/0638* (2013.01); *F16C 23/045* (2013.01); *F16D 2125/587* (2013.01); *F16D 2125/60* (2013.01)

(58) Field of Classification Search
CPC .............. F16C 11/0614; F16C 11/0671; F16C 11/0638; F16C 23/045; F16D 2125/587; F16D 2125/60; B60T 11/046
See application file for complete search history.

(56) References Cited

U.S. PATENT DOCUMENTS 2,717,792 A * 9/1955 Pelley ...................... F16J 15/50
403/69
3,038,730 A * 6/1962 Bentley ................... B64C 13/02
277/507

(Continued)

FOREIGN PATENT DOCUMENTS

| EP | 2438434 A2 | 6/2014 |
|---|---|---|
| EP | 2738434 A2 | 6/2014 |
| WO | 0196777 A1 | 12/2001 |

*Primary Examiner* — Anita M King
(74) *Attorney, Agent, or Firm* — Stetina Brunda Garred & Brucker

(57) ABSTRACT

The invention relates to an umbilical termination assembly for terminating a cable or umbilical. The termination assembly comprises a plurality of umbilical elements extending from an umbilical and which pass through a bulkhead plate. The seated ball element has a spherical body through which an umbilical element passes. The ball element is seated in a cup member which allows the ball element to rotate through a large range of angles allowing it to be aligned with the umbilical element without the umbilical element needing to be manipulated or forced into position. The umbilical element can then be attached to the ball element which is supported by the cup member on the bulkhead. This allows the axial tension in the umbilical element to be transferred to the bulkhead.

22 Claims, 7 Drawing Sheets

(56) References Cited

U.S. PATENT DOCUMENTS

| | | | | |
|---|---|---|---|---|
| 3,122,046 | A | * | 2/1964 | Baker ............... H02G 1/10 |
| | | | | 83/600 |
| 3,577,605 | A | * | 5/1971 | Fischer ............ F16G 11/048 |
| | | | | 24/114.5 |
| 3,977,005 | A | * | 8/1976 | Cejka ............... H01Q 1/084 |
| | | | | 343/715 |
| 4,273,951 | A | * | 6/1981 | Terreri ............. H02G 1/14 |
| | | | | 137/320 |
| 9,157,555 | B2 | | 10/2015 | Henry |
| 9,783,175 | B2 | * | 10/2017 | Buchwitz ......... F16C 11/103 |
| 2009/0226243 | A1 | | 9/2009 | Krywitsky |
| 2014/0231597 | A1 | | 8/2014 | Buchwitz et al. |

\* cited by examiner

TERMINATION ASSEMBLY

CROSS REFERENCE TO RELATED APPLICATIONS

The present application claims priority to United Kingdom Application No. 1815721.4 filed Sep. 26, 2018, the entirety of the disclosure of which is expressly incorporated herein by reference.

STATEMENT RE: FEDERALLY SPONSORED RESEARCH/DEVELOPMENT

Not Applicable.

FIELD OF THE INVENTION

This invention relates to a termination assembly. In particular, it relates to a termination assembly for a cable or umbilical and a method of assembling such a termination assembly.

BACKGROUND OF THE INVENTION

Cables and umbilicals are generally used to supply a variety of energy forms (e.g. electrical, hydraulic, pneumatic energy etc.), signals (electrical, optical, pressure signals) or consumables to an apparatus and can be used both above and below sea level. Umbilicals may be deployed on the seabed and typically consist of a collection of one or more types of elongate active umbilical elements including electrical, pneumatic, hydraulic and chemical elements. For additional flexibility and mechanical strength, these elements are wound together with additional outer components, as required. Umbilicals aid in providing the necessary control to and from subsea installations by transmitting, ordinarily, various forms of chemicals, signals and power. The term umbilical will be used herein to refer to any similar elongate structure such as an umbilical or cable.

Such umbilicals may be large and heavy making the connection of the umbilical at each end challenging. Umbilicals are typically terminated in an assembly which allows manipulation of the end of the cable and also suitable connection to the elements within the umbilical. This is done via an Umbilical Termination Assembly (UTA) which provides a platform to terminate the umbilical lines by attachment to a fixed support element. They may also be used, in some cases, to move them into position and also, for example, to bring them up to the surface for servicing and connection.

A common umbilical for use in sub-sea systems comprises a number of elements which can include steel tubes. Together, with the other umbilical elements, these steel tubes are typically wound together in a helical pattern. These steel tubes are resistant to high external collapse pressures and axial loads, which the umbilicals are subject to during handling, installation, and servicing. The loading strains associated with the handling of umbilicals are particularly an issue of concern when terminating the lines with a UTA, where the forces are concentrated. In order to ensure safe and reliable termination, a number of issues have to be considered, to transfer loads from the umbilical to fixed mountings without high localised stresses being induced in the umbilical.

A method for umbilical termination utilises a bulkhead plate to bear the induced loading strains. This plate is part of the overall termination structure which terminates the end of the umbilical line. The end of the umbilical will typically be placed in the interior cavity of a conical or bell-shaped housing. A bulkhead will then be placed over the end of the cone. The bulkhead is provided with a plurality of holes through which the steel tubes are passed. The steel tubes are then welded directly to the bulkhead. The interior cavity of the termination structure may then be filled with compression resistant resin to resist radial movements of the steel tubes inside the termination. The steel tubes will typically be bent or be divergent within the interior cavity to assist with passing the axial load in the umbilical to the resin structure and into the termination assembly.

The bulkhead plate is typically a single machined plate which serves to provide mechanical attachment of at least some of the elements in the umbilical to the termination assembly. Generally, the bulkhead plate is wholly or substantially steel. With the steel tubes welded in the manner mentioned previously, the load borne by the steel tubes can be transferred to the bulkhead plate. The welding of the tubes to the bulkhead and use of the resin aims to evenly distribute the load from the umbilical to the fixed mounting point to which the UTA is attached.

However, the steel tubes are relatively stiff and so manoeuvring them into position can be relatively challenging, particularly if they have to be bent into the desired shape. If the holes in the bulkhead are formed to match the outer diameter of the steel tubes, to provide a tight mechanical fit, then the steel tubes need to be accurately aligned with the holes. If the steel tube axis is not perfectly perpendicular to the bulkhead plate, it is difficult to get them to pass through the holes without flexing them or enlarging the holes to allow a degree of misalignment. Misalignment of the tube results in poor quality welding between the tubes and the bulkhead plate. As an umbilical potentially comprises a large number of helically wound umbilical members, it would be extremely difficult and time consuming to attempt to straighten and align the umbilical members.

These misalignments pose two major drawbacks for the welding process. Firstly, due to the anticipation of tube misalignments, each plate hole has to be machined with a diameter significantly larger than its intended tube counterpart, which leads to an undesired, significant gap around the tube which affects the overall quality and load transfer reliability of the welds formed.

Secondly, misalignments of this nature are not compatible with automatic welding processes such as orbital welding machines. These machines are clamped onto the tube with their welding head then guided in rotation around the tube axis. Should the tube axis fail to be perpendicular to the bulkhead plate, the welding interface will not be circular, and the welding head will not follow the intersection of the tube and the plate leading to an uneven weld of lower reliability and quality.

Attempting to simultaneously align several steel tubes with the bulky bulkhead remains a difficult and demanding task. It requires significant skill and manual input to weld all the separate tubes perfectly whilst maintaining an optimal alignment of the rest of the tubes. Any misalignments, however slight, can result in unbalanced loading transfer and therefore potential weak spots or areas in the welding between the tubes and plate.

The present invention aims to overcome or at least ameliorate one or more of the problems set out above.

SUMMARY OF THE INVENTION

Therefore according to the present invention there is provided an umbilical termination assembly for terminating an umbilical having one or more umbilical elements, the termination assembly comprising: a bulkhead having one or more concave recesses, each recess having a partial spherical inner surface opening on one side of the bulkhead and a smaller opening on an opposite side of the bulkhead; and one or more ball elements having a spherical body portion with an elongate channel passing therethrough, each arranged with the spherical body portion at least partially inserted into a respective one of said recesses such that the spherical portion is prevented from passing through said bulkhead.

With this arrangement, the ball element can be oriented to correspond to the angle of the umbilical element minimising any re-alignment, bending or straightening of the umbilical elements to pass through the bulkhead plate of the assembly. This avoids the need to provide large tolerances to accommodate variations in the angle and orientation of the umbilical elements and therefore helps to provide easier and enhanced welding of the umbilical tubes to the bulkhead plate. This in turn helps to provide a more reliable and capable joint for providing superior axial load transfer between the plate and tubes. Owing to the spherical body of the ball element, it can be oriented in the recess to accommodate the angle of the umbilical element before they are secured in place.

The diameter of the channel is preferably manufactured to correspond closely to the dimensions of the umbilical element which it is intended to pass through it. The umbilical element may terminate at the inner side of the termination assembly abutting the ball element before it is joined thereto. The umbilical elements may pass through the ball element and then be joined at the other end of the channel on the outer side of the assembly, whereby some or all of the umbilical element may pass through the bulkhead plate and protrude out beyond the ball element.

Preferably, the seated ball joint is formed from the same, correspondingly similar or an otherwise compatible material to that of the umbilical elements. One such suitable material is steel. This allows for joining using welding although other techniques may be used such as by bonding using an adhesive or other mechanical attachment methods. The termination assembly may comprise a number of seated ball joints which may or may not be the same; the seated ball joint can be adapted to suit a variety of umbilical elements as desired.

The seated ball joint is preferably arranged to allow the umbilical element to pass through the bulkhead at a range of angles relative to the axis perpendicular to the plane of the bulkhead. Preferably angles of up to a 40° may be accommodated. The seated ball joint achieves this range of rotations by interacting with a 'cup' like member which can be inserted into the bulkhead plate. The cup member can be inserted into a receiving hole in the bulkhead plate with the recess for receiving the ball element provided in the cup member. The interaction between these two elements resembles that of a ball and socket type joint structure. The cup member preferably has a spherical inner face providing a spherical 'seat' which allows the complementary ball element to fully locate within it at a range of angles.

Once the umbilical element is positioned relative to the ball element, the final welding is done between the ball element and the umbilical element to fix them relative to each other. They are preferably welded by passing the umbilical through the channel and forming a weld where the umbilical element exits the channel. A fillet weld is preferably formed in between the end of the ball element and the outer edge of the umbilical element.

In use, as an axial tensile load is applied to the umbilical, this can be passed to the bulkhead plate and vice versa. In this way, the present invention allows distribution of the axial load being applied between them to pass through the ball element into the bulkhead plate. The present invention also allows a more balanced transfer of loads on the umbilical elements through the bulkhead plate.

The ball element may be joined to the cup member, for example by welding. The cup member may also be joined to the bulkhead plate, for example by welding. However, it may be desirable to use different materials for some of the components. For example, it may be desirable to use different materials for the bulkhead plate and the umbilical elements. This may be desirable for mechanical or cost reasons. In this way, the cup joint can reduce the costs associated with implementing the present invention as it will allow for example the bulkhead plate material to be manufactured from a different material to that of the ball and cup joints.

Where different materials are used, it may be desirable to use an additional isolation bush between the cup member and the bulkhead plate. This allows a degree of flexibility with regards to the materials chosen for the bulkhead plate and the cup joint. This additional bush layer can provide electrical insulation to minimise corrosion due to electrochemical interactions between different metals used for the bulkhead plate hole and the cup member and umbilical element materials.

The seated ball joint may additionally comprise a sleeve which extends longitudinally outwards from the ball element extending the channel therethrough. This can provide additional stability by allowing, together with the seated ball element, a greater transfer of the axial loading between the steel tube and bulkhead plate.

The cup member may further include an external thread allowing it to be screwed into a corresponding thread on the bulkhead. The thread can be used for adjusting pre-tensioning of the load on the umbilical element by screwing the cup member in and out. Where an isolation bush is provided, a thread may be formed on the bush such that the cup member may be screwed in and out of the bush. In addition, or alternatively, the bush may have an external thread allowing it to be screwed into the bulkhead plate, similarly allowing adjustment of the pre-tension. With the screw fully threaded into both elements, the magnitude of said tensioning is minimised. As the threaded part is retracted from the threaded hole, the magnitude of the tension induced in the ball joint begins to increase as the umbilical element is pulled through the hole in the bulkhead.

BRIEF DESCRIPTION OF THE DRAWINGS

The description will now be described in detail by reference to specific embodiments with reference to the attached drawings in which-.

DETAILED DESCRIPTION

Figure 1:
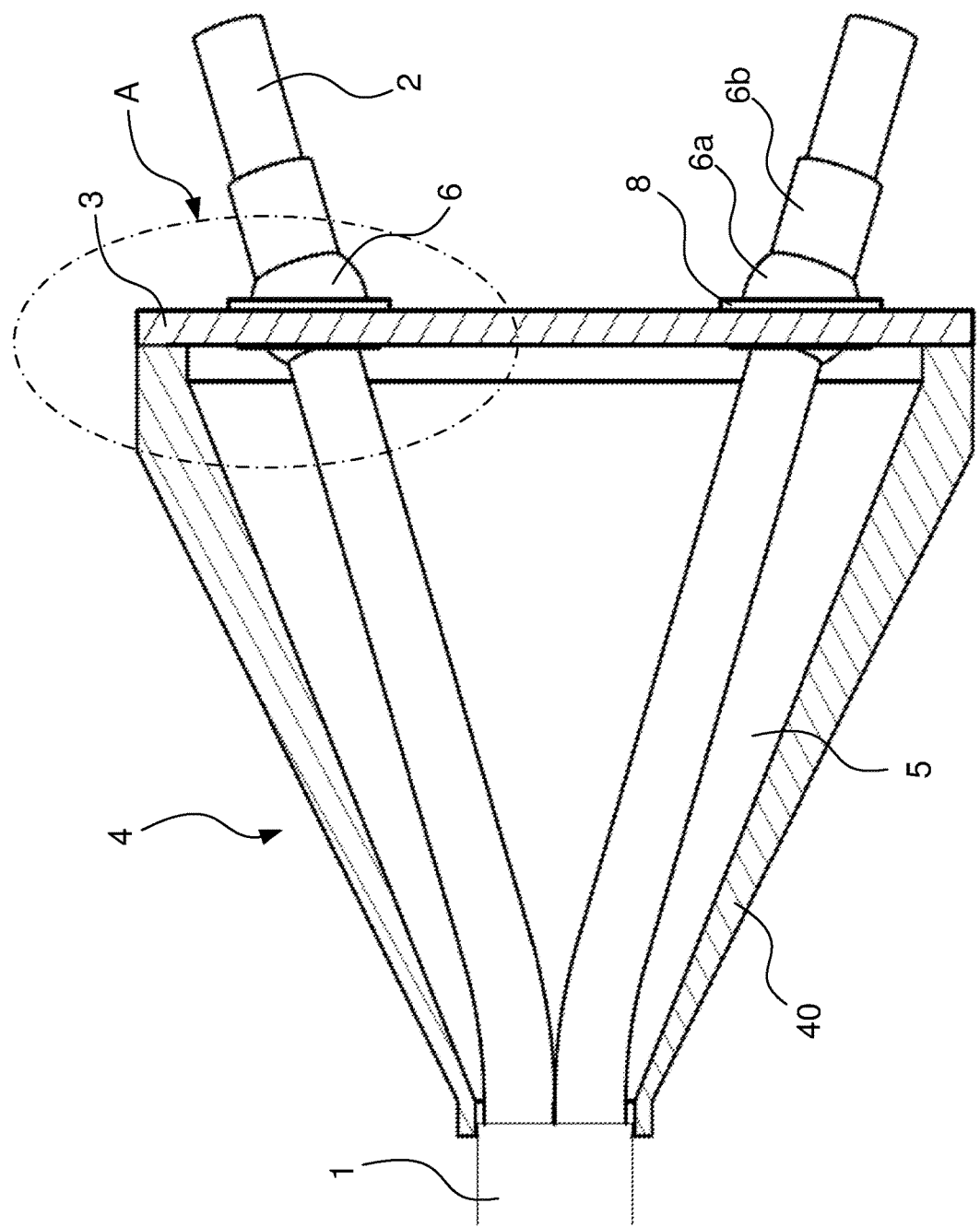
FIG. 1 is a partial cut-away view of an umbilical termination assembly according to the present invention.

FIG. 1, shows an embodiment of a termination assembly 4 for an umbilical 1, according to the invention. In this embodiment, the umbilical termination 4 comprises a plurality of umbilical elements, although only two steel tubes 2 are shown in the figure. The tubes 2 extend from umbilical 1, through the termination cavity 5 of the termination assembly 4 and pass through respective holes in a steel bulkhead plate 3. Additional umbilical elements would also pass through the bulkhead plate 3. The bulkhead plate 3 is affixed to the termination assembly 4, to form the termination cavity 5. In the arrangement shown, the conical can portion 40 which forms the body of the termination assembly 4 may be formed in multiple parts which can be joined together.

It can be seen from FIG. 1 that the steel tubes 2 are bent through a relatively small angle close to the end of the umbilical 1 but are otherwise relatively straight. As such, minimal mechanical working of the tubes is required to form the termination assembly. This is in comparison to previous solutions where it was necessary to make multiple bends to spread the tubes as they exit the umbilical and then bend them again to try to ensure that the tubes are perpendicular to the bulkhead and to align them with the holes in the bulkhead.

Figure 2:
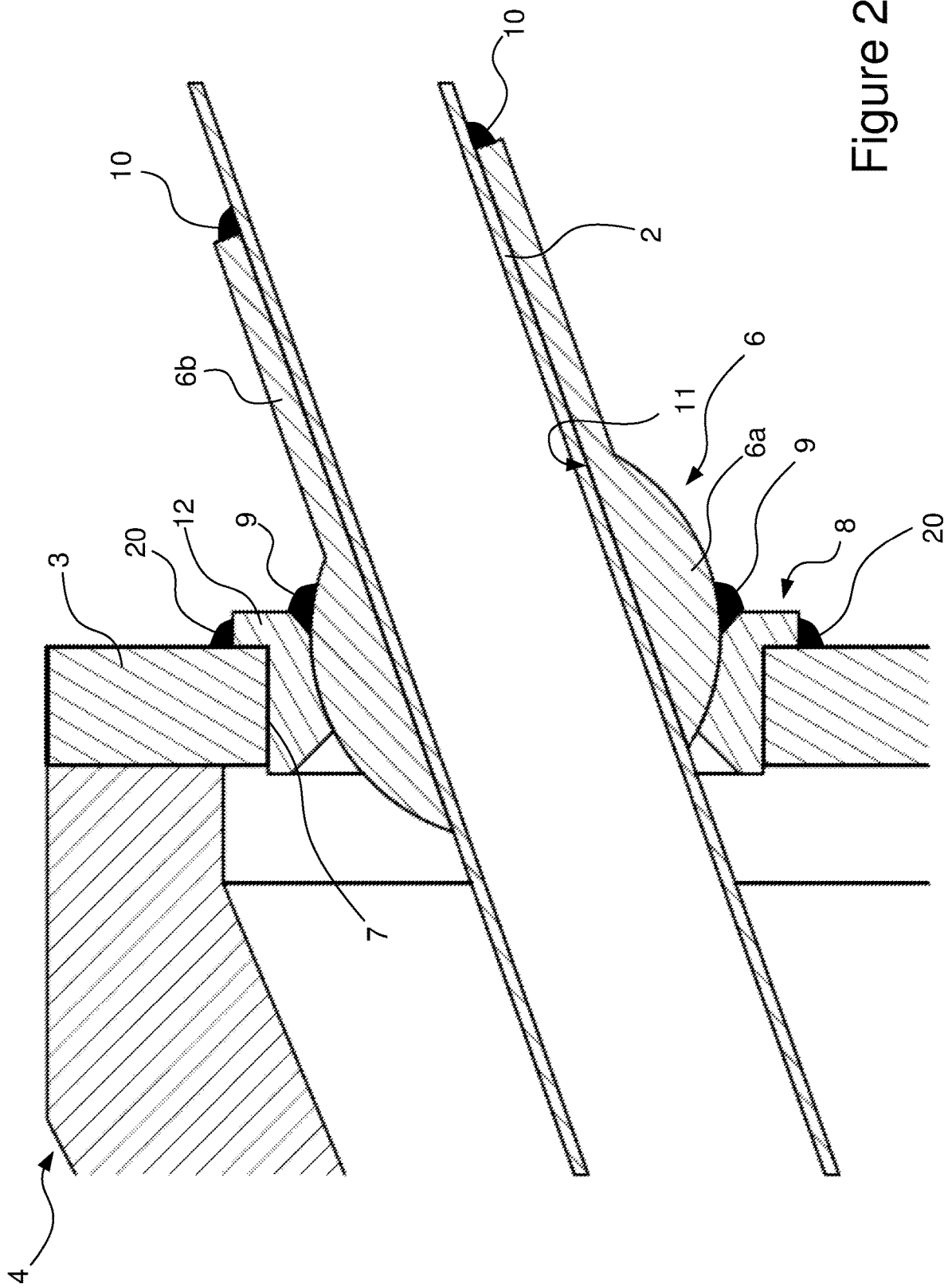
FIG. 2 is a side cross sectional view of region A in FIG. 1.

FIG. 2 shows the region A in FIG. 1, where the tube passes through the bulkhead. The ball element 6 comprises a spherical portion 6a with a cylindrical extended sleeve portion 6b which extends away from the spherical portion 6a. A straight elongate channel 11 passes through the spherical body, extending from the side of the spherical portion 6a opposite to where the extended sleeve portion 6b is provided, through the spherical portion 6a and into the extended sleeve portion 6b. As such the channel 11 extends through the ball element 6 providing an aperture through which a steel tube 2 can be passed. The diameter of this channel 11 is designed to correspond closely to the outer diameter of a steel tube 2 which is intended to be passed through the ball element 6.

The extended sleeve portion 6b provides additional support to the steel tube 2 passing through the ball element 6. The sleeve portion 6b helps to align the ball element 6 with the tube 2 which helps to alleviate the loads needed for manual manipulation of the tube into the desired tube orientation with respect to bulkhead plate 3.

The ball element 6 is positioned partially within the bulkhead plate 3 and sits within a cup member 8 such that the central spherical portion 6a of the ball element 6 lies substantially in the plane of the bulkhead plate 3, with the rest of the ball element 6 and extended sleeve portion 6b protruding out from the bulkhead plate 3.

The cup member 8 comprises a body with a concave partially spherical inner surface to correspond to the shape of the spherical portion 6a of the ball element 6. A protruding outer lip 12 extends away from the cup member 8 generally in the direction of the plane of the bulkhead plate 3. As the cup member 8 is inserted into the bulkhead plate 3, the lip 12 engages the surface of the bulkhead plate 3 preventing the cup member 8 from passing further into the bulkhead such that the cup member 8 can be secured in the hole 7 in the bulkhead plate 3 without passing through. In this embodiment, the cup member 8 has a generally circular cross-section for insertion into the circular hole 7. However, in other embodiments the cup member 8 may have a different cross section for insertion into a suitably shaped hole 7.

In order to prepare the termination assembly 4, the end of the umbilical 1 is passed into the outer shell part of the termination assembly 4 so that the umbilical elements pass through the termination cavity 5. The steel tubes 2 are passed through the respective holes 7 in the bulkhead plate 3. A cup member 8 is then passed over each of the tubes 2. The tubes 2 are then slid into the ball element 6 so that they pass through the spherical portion 6a, then through the sleeve portion 6b and out of the other end of the channel 11. The cup member 8 and ball element 6 are then slid down the tube 2 towards the bulkhead plate 3. The cup member 8 is seated in the hole 7 and the cup member 8 is brought into engagement with it such that the spherical portion 6a lies in the recess defined by the concave inner surface of the cup member 8.

As the cup member 8 is positioned in the bulkhead plate 3, with a steel tube 2 passed through it, the ball element 6 is able to rotate freely within the confines of the cup member 8. In this way, the ball element 6 and cup member 8 are engaged in a ball-and-socket arrangement allowing multidirectional movement and rotation, preferably up to a 40° angle, about the central axis of the steel tube 2. In practice, this allows the channel 11 through the ball element 6 to be aligned with the tube 2 rather than having to apply force to the tube 2 to bend or align it to conform with the alignment of the ball element 6.

The engagement of the ball element 6 with the cup member 8 is made possible by the cup member's 8 curved inner surface which is complementary with respect to the spherical body of the ball element 6. This allows it to be seated in the recess with a good mechanical fit.

With the ball element 6 arranged in the cup member 8, the process of securing the umbilical elements to the termination assembly 4 can now begin. As the steel tube 2 can be arranged at the desired angle relative to the bulkhead without applying significant force, it should now be in the desired orientation. A positioning weld 9 can be made between the cup member 8 and the ball element 6 to secure the orientation of the ball element 6 relative to the cup member 8. The weld may be formed as one or more spot welds or a complete seam around the periphery of the cup member 8 and ball element 6. Preferably a fillet weld is formed in the corner formed between the outer face of the ball element 6 and the inner rim of the cup member 8, as shown in FIG. 2. The cup member 8 may include a chamfered inner edge to provide a larger recess for forming a weld in.

A further weld 10 is also made between the end of the sleeve portion 6b and the steel tube 2, for preventing the steel tube 2 from moving longitudinally backwards and forwards within the channel 11 and securing it in place. The weld 10 can also be made as one or more spot welds or all the way around the interface between the end of the ball element 6 and steel tube 2. Again, a fillet weld may be formed in the corner formed between the end face of the sleeve portion 6b and the outer circumferential surface of the steel tube 2.

A further weld 20 is also shown in FIG. 2, for connecting the cup member 8 to the bulkhead plate itself. Again, this weld may be made as one or more spot welds or all the way around the interface between the lip 12 of the cup member 8 and bulkhead plate 3. A fillet weld may be formed in the corner formed between the outer face of the bulkhead plate 3 and the outer circumferential edge of the lip 12 of the cup member 8.

In this embodiment, welds are used to connect the elements together. This is particularly convenient for constructions where similar materials are used for each of the elements. However, other methods of connecting the elements may be used such as bonding with adhesives, mechanical attachment etc.

Whilst the weld 10 is needed to transfer the axial load in the tube 2 to the bulkhead plate, the weld 9 is not essential as it serves to maintain the ball element's 6 position relative to the cup member 8. Similarly, the weld 20 between the cup member 8 and the bulkhead plate 3 is not essential for supporting the axial load between the bulkhead plate 3 and the umbilical 1.

Once the steel tube 2, ball element 6, cup member 8 and bulkhead plate 3 are joined together, they form a strong connection allowing axial force applied between the bulkhead plate and the umbilical to be borne at least partially via the steel tubes. It also serves to hold the entire termination assembly 4 together in a unitary structure.

Once the umbilical elements have been secured, the termination cavity 5 is filled with a resin which provides additional stability and load transferring potential between the steel tubes 2 which pass through the termination cavity 5, and the resin within the cavity 5.

The diameter of the channel 11 through the ball element 6 is manufactured to correspond closely to the specific umbilical element, or steel tube 2 which means a much smaller gap is left between the steel tube 2 and sleeve portion 6b compared to alternative methods, where the gap between the bulkhead plate 3 and steel tube 2 needs to be sufficiently large to accommodate the various potential angles that the tube may pass through the hole in the bulkhead plate. Such a large gap tends to result in a poorer weld with weak spots that could lead to failure. The dimensions of the channel 11 of the ball element 6 are determined to allow sufficient clearance for the intended umbilical elements to be passed through without needing to allow for significant misalignment of the tubes relative to the channel 11. In this case, the outer diameter of the intended steel tube 2 to be passed through the ball element 6 would need to correspond to the inner diameter of the channel 11 with a small allowance for manufacturing tolerances and to ensure the ball element 6 can be slid along the tube 2 into the correct position.

With this arrangement, the ball element 6 helps to minimise the requirement for umbilical elements, or steel tubes 2, to be manipulated or configured to be aligned with respect to the bulkhead plate 3 and the holes in them. It also provides a more reliable and stronger attachment between the elements and the termination assembly, allowing improved transfer of axial loading strains to be achieved. In addition, the gap reduction between the cup member 8 and ball element 6 material boundaries, and the extended sleeve portion 6b and steel tube 2, allow for more reliable and safer welding while allowing the potential use of an automatic welding process.

In use, the umbilical may be transported by pulling the end using the termination assembly 4 and may also be supported in use by the termination assembly 4. Under such circumstance, the load, due to the weight of the umbilical, and to cause it to move is supported using the termination assembly 4. This requires the axial load in the umbilical 1 to be transferred to the termination assembly 4. With an axial load applied to the bulkhead plate 3, the load is transferred to the cup member 8 and then into the ball element 6. The axial load is then transferred from the ball element 6 into the steel tube 2 via the retention weld 10. Conversely, axial loads in the steel tubes 2, due to the length, weight and rigidity of the wound umbilical elements, can be transferred into the bulkhead plate 3 by the reverse of the pathway described above. This bi-directional transfer of axial load forces between the steel tubes 2 and bulkhead plate 3 allows for more evenly distributed axial loads across the entire termination assembly 4 resulting in a safer and more reliable termination assembly 4 as a whole.

Whilst the use of the steel tube umbilical elements to transfer load between the umbilical and to the bulkhead is significant, it is not the only mechanism and load may also transfer via other pathways such as from the steel tubes into the resin fill of the cavity 5 and to the inner surface of the bulkhead plates.

Figure 3:
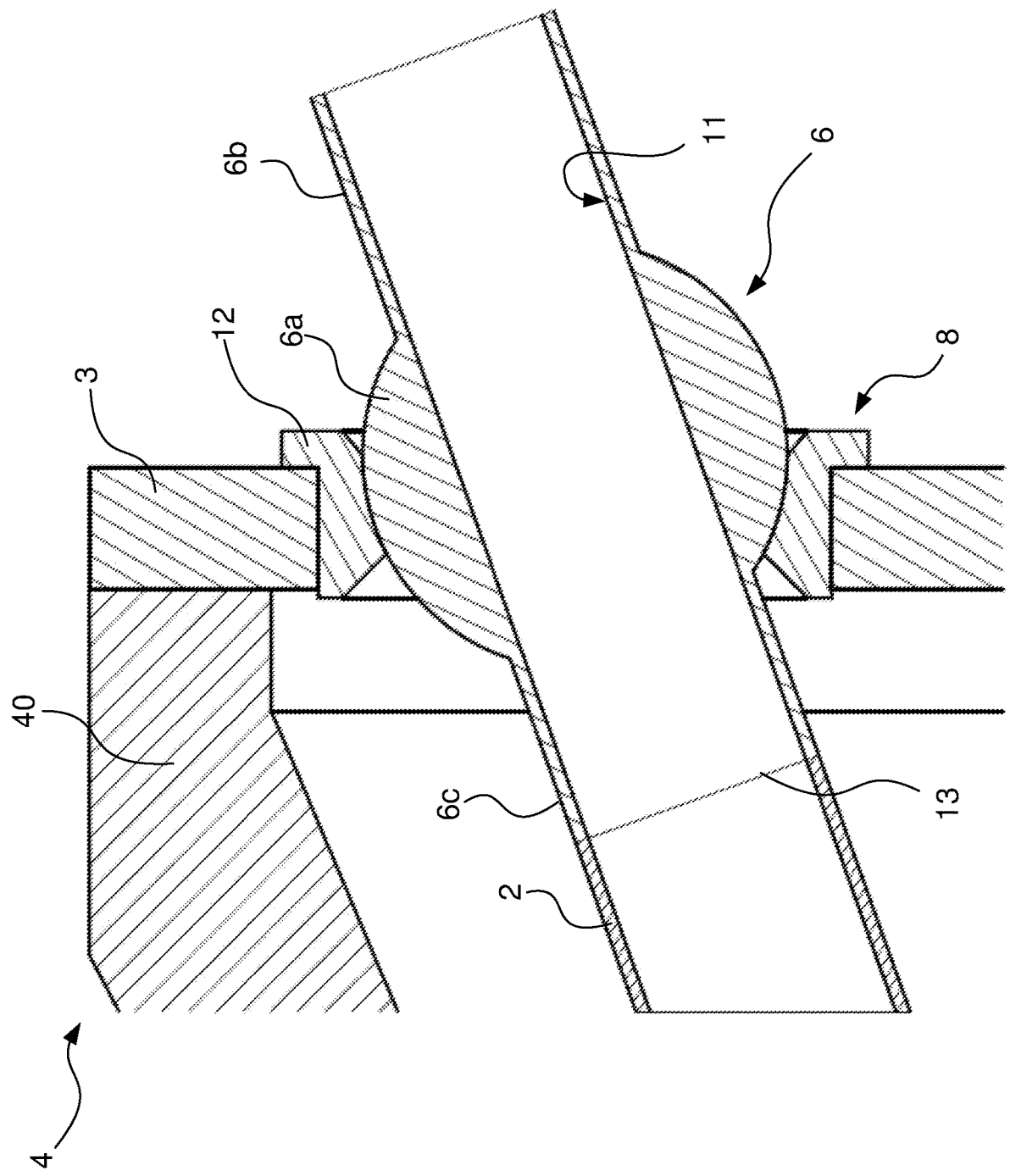
FIG. 3 is a side cross sectional view of a modified embodiment of the invention.

FIG. 3 shows a cross sectional view of another embodiment of the present invention. The ball element 6 is similar to that of FIG. 2 but comprises an additional extended sleeve portion 6c at the other end of the channel 11 to the outer end of the channel 11. This additional extended sleeve portion 6c extends the channel 11 longitudinally from the spherical portion 6a of the ball element 6. The end of the steel tube 2 and the extended sleeve portion 6c of the ball element 6 are abutted and a weld (typically a butt weld) formed at the interface 13 between the two concentric, tubular structures. As shown in the embodiment in FIG. 3, the diameter of the steel tube 2 is arranged to correspond to that of the extended sleeve portion 6c allowing them to be aligned before subsequent welding, securing a connection between the steel tube 2 and ball element 6 via the extended sleeve portion 6c.

To provide access to the interface 13 between the end of the steel tube 2 and the extended sleeve portion 6c of the ball element 6, the weld would typically be formed before the can portion or portions 40 are put in place. Once the weld has been formed the can 40 surrounding the void would be attached to the bulkhead.

Figure 4:
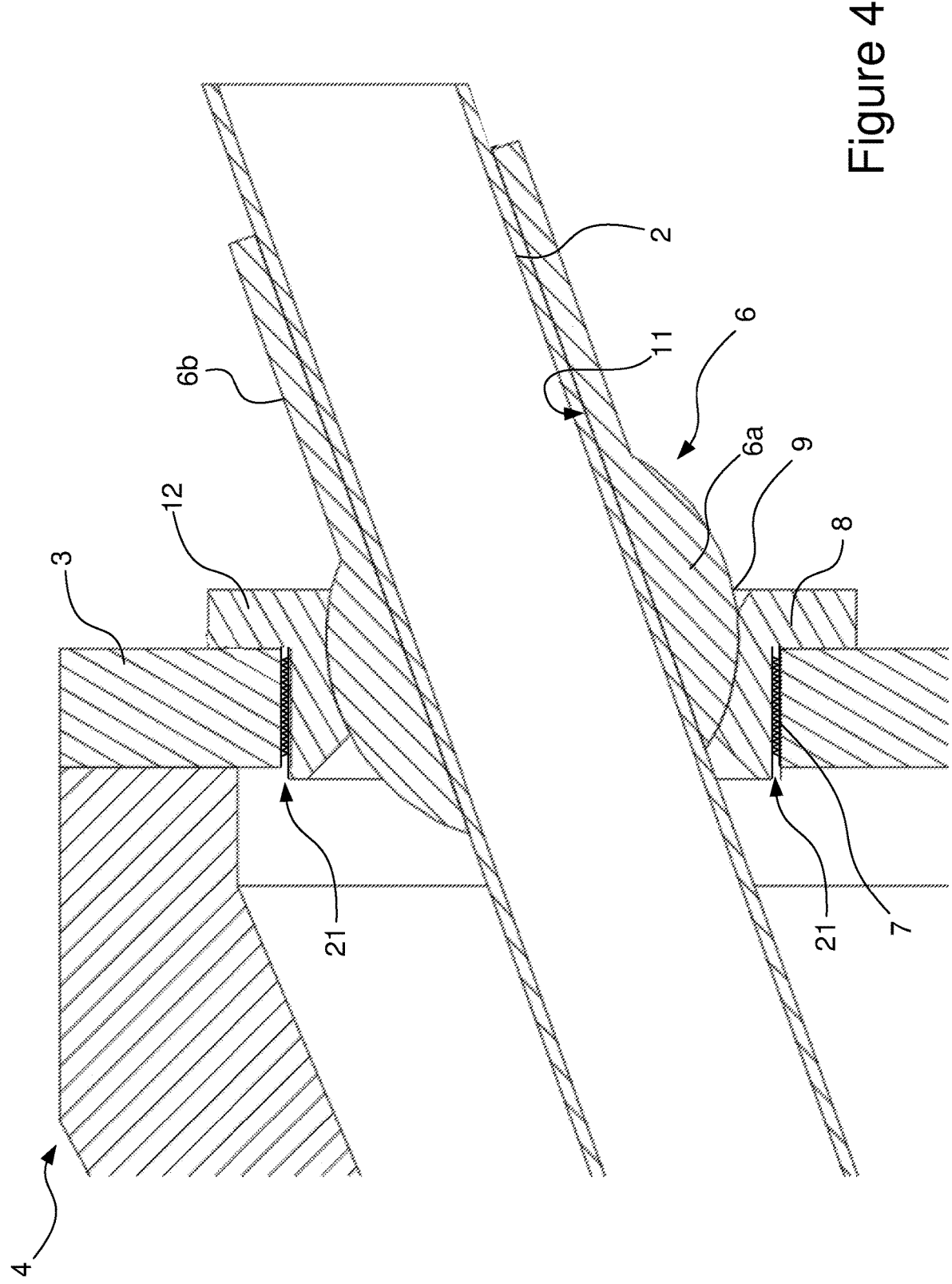
FIG. 4 is a side cross sectional view of a further modified version of the arrangement shown in FIG. 2.

FIG. 4 shows a modified version of the arrangement shown in FIG. 2. In this arrangement, the welds have not yet been formed and so are not shown. Otherwise, the structure is similar to that of FIG. 2 except for a threaded interface 21 between the outer circumference of the cup member 8 and the inner circumference of the hole 7 formed in the bulkhead plate 3. In the FIG. 2 arrangement, the cup member 8 is simply slid into the hole 7 in the bulkhead 3. With this arrangement, the cup member 8 is screwed into the hole and the tube 2 is welded to the sleeve portion 6b, as before. The cup member 8 can then be rotated to cause it to move axially in or out of the hole. The action of this axial movement can be used to adjust the pre-tensioning of the arrangement. This allows an initial tensile load to be established but also allows the loads on different tubes to be balanced across the bulkhead plate 3. Once set up, welds or other means of securing the elements in place may be used such as the welds 9 or 20 in FIG. 2.

The threaded cup portion may be used in a similar way with the embodiment of FIG. 3.

Figure 5:
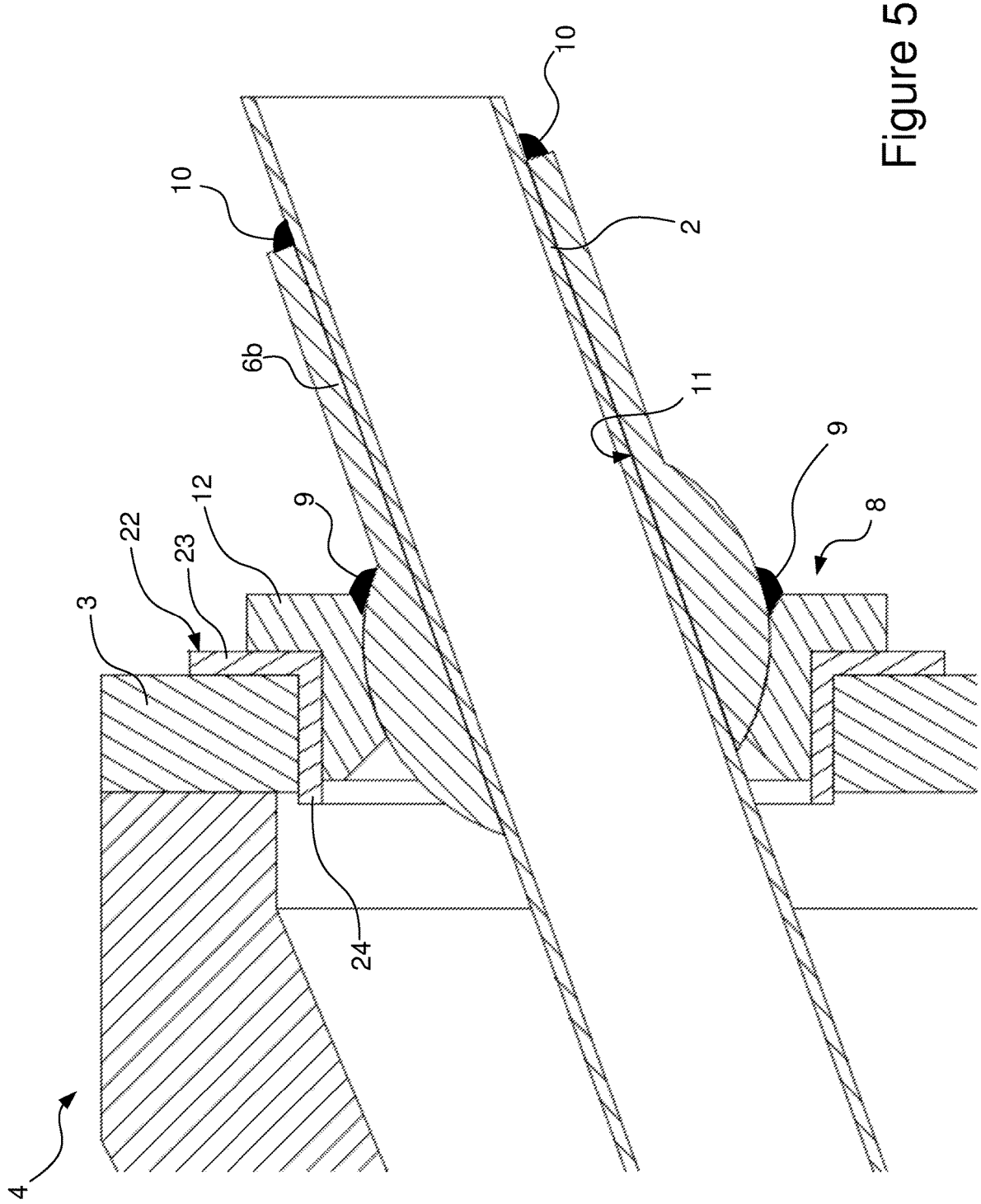
FIG. 5 is a side cross sectional view of another modified version of the arrangement shown in FIG. 2.

FIG. 5 shows a further modified version of the arrangement of FIG. 2. In this arrangement, a bush 22 is provided between the cup member 8 and the bulkhead plate 3. The bush 22 is formed from a flat annular portion 23 and a cylindrical portion 24 which is arranged to lie within the hole 7 in the bulkhead plate 3. The cup member 8 is then inserted into the hole 7 through the centre of the bush 22 with the lip 12 of the cup member 8 abutting the outer face of the portion 23 of the bush 22.

The bush 22 is made of an insulating material to provide electrical isolation between the cup member 8 and the bulkhead plate 3. The isolation bush 22 allows differential materials to be used for the cup member 8 and the bulkhead plate 3 whereby the bush 22 acts as an electrical insulator between the two materials inhibiting electrochemical corrosion which may occur between the two different types of materials. The isolation bush 22 allows the cup member 8 and ball element 6 to be used with a broader range of bulkhead plate 3 materials, as the invention is no longer constrained by the material of the bulkhead plate 3.

As shown in FIG. 5, a weld is formed between the tube 2 and the extended sleeve portion 6b of the ball element 6. A weld 9 is also shown to join the ball element 6 to the cup member 8, although as noted above, other methods may be used, or the weld 9 may be dispensed with. No weld is formed between the cup member 8 and the bulkhead plate 3 to maintain the electrical isolation. However, they may be attached to each other via the bush 22, for example using a bonding agent.

Figure 6:
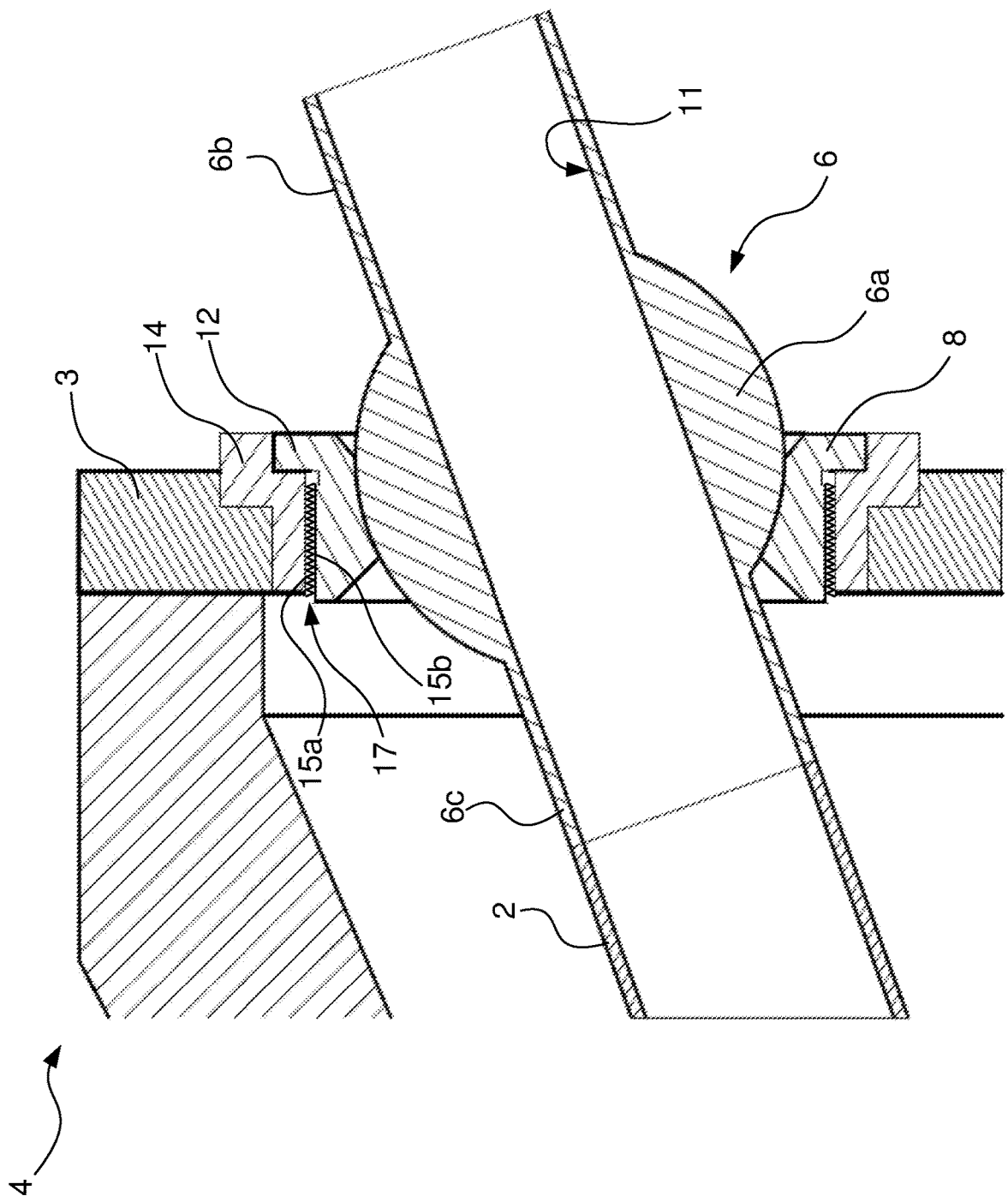
FIG. 6 is a side cross sectional view of a modified version of the arrangement shown in FIG. 3.

FIG. 6 shows a cross sectional view of a further embodiment of the present invention which may also be implemented with the embodiments described herein. In this arrangement an isolation bush 14 is inserted into the bulkhead plate 3 between the bulkhead plate hole 7 and the cup member 8 circumferentially around the member 8, in a similar manner to the arrangement of FIG. 5. The isolation bush 14 would be inserted into the bulkhead plate 3 before the cup member 8, in the termination assembly process. As before, the isolation bush 14 allows differential materials to be used for both the cup member 8 and the bulkhead plate 3.

The inner surface 15a of the isolation bush 14 and the outer surface 15b of the cup member 8 are threaded (although this is not essential) such that a threaded portion 17 can be used to induce pre-tensioning in the ball element 6. This threaded portion 17 can be fully or partially screwed into the threaded aperture, formed by the inner surface 15a of the isolation bush 14 and the outer surface 15b of the cup member 8, during the termination assembly process. This tension can be adjusted by screwing the cup member 8 in and out of the bush 14. With the cup member 8 fully inserted into the threaded aperture 17, it can be screwed outwardly to increase the pre-tension on the tube 2. The tension can be reduced again by screwing the cup member back into the bush. This allows the tensions on each of the tube members to be adjusted and balanced as required.

In this way, more dynamic and incremental tensioning between the steel tubes 2 and the termination assembly 4 can be achieved with each independent threaded portion being adjusted as additional steel tubes are welded on the bulkhead plate 3, re-adjusting the axial load as required.

Figure 7:
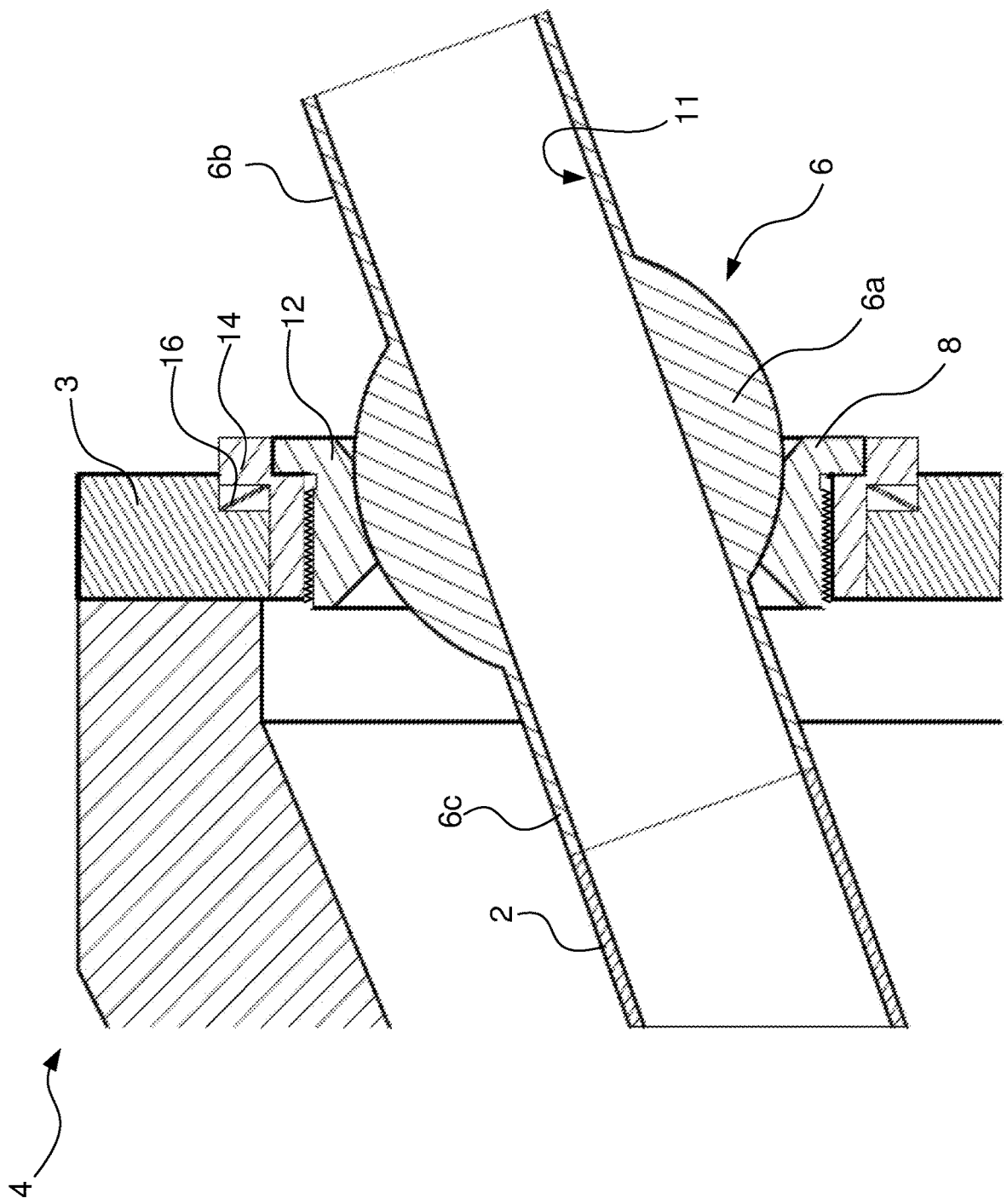
FIG. 7 is a side cross sectional view of a further modified version of the arrangement shown in FIG. 3.

FIG. 7 shows a cross sectional view of another embodiment of the present invention. This arrangement is similar to that shown in FIG. 6 but includes a resilient member 16 in the form of a spring or spring washer 16 arranged to lie in-between the isolation bush 14 and bulkhead plate 3 circumferentially around the edge of the hole in the bulkhead plate 3. It is inserted before inserting the isolation bush 14 in the bulkhead plate 3 hole in the termination assembly process, as shown by FIG. 5. Here, the spring 16 provides a means to distribute the loads and forces placed on the entire apparatus by the tubes 2. This can also help to reduce vibration transferred between the parts of the assembly and also balance transient loads between the tubes. These loads, forces and vibrations may be experienced during the termination process assembly and during operation. For subsea umbilical terminations forces and vibrations may be induced by movement resulting from the effect of the sea which may cause the umbilical to move back and forth. The spring 16 absorbs and distributes these variations in loads by compressing and expanding, giving the apparatus a higher tolerance to these forces and protecting the materials either side of the spring 16 from damage. This spring 16 arrangement can also be used in any of the other embodiments.

The invention claimed is:

1. An umbilical termination assembly for terminating an umbilical having a plurality of umbilical elements extending from said umbilical, the termination assembly comprising:
a bulkhead having a plurality of concave recesses, each recess having a partial spherical inner surface opening on one side of the bulkhead and a smaller opening on an opposite side of the bulkhead; and
a plurality of ball elements having a spherical body portion with an elongate channel passing therethrough, each arranged with the spherical body portion at least partially inserted into a respective one of said recesses such that the spherical portion is prevented from passing through said bulkhead, wherein each of said ball elements is attached, in use, to a respective umbilical element.

2. The umbilical termination assembly according to claim 1 wherein said ball element is attached to said umbilical element by welding.

3. The umbilical termination assembly according to claim 1, wherein said bulkhead includes a plurality of cup members inserted into a bulkhead plate, each of said recesses being provided in a respective cup member.

4. The umbilical termination assembly according to claim 3, wherein the ball element is arranged to sit in the cup member such that the axis of the elongate channel may be angularly offset from an axis normal to the plane of the bulkhead plate.

5. The umbilical termination assembly according to claim 4 wherein said angular offset is between 0 and 40 degrees.

6. The umbilical termination assembly according to claim 3, wherein said ball element is attached to the cup member to prevent relative movement.

7. The umbilical termination assembly according to claim 3 wherein said ball elements include an outer extension portion extending away from said assembly and said elongate channel extends continues from said spherical body portion along said outer extension portion.

8. The umbilical termination assembly according to claim 7 wherein said respective umbilical element extends through and out of said elongate channel and said respective umbilical element is attached to said outer extension portion.

9. The umbilical termination assembly according to claim 3 wherein said ball elements include an inner extension portion extending into said assembly and said elongate channel continues from said spherical body portion along said inner extension portion.

10. The umbilical termination assembly according to claim 9 wherein said respective umbilical element is attached to said inner extension portion.

11. The umbilical termination according to claim 10, wherein an end of said respective umbilical element is joined to said inner extension portion such that said respective umbilical element does not pass through said ball element.

12. The umbilical termination assembly according to claim 3, wherein said bulkhead further comprises an isolation bush, wherein said isolation bush is inserted into said bulkhead plate and said cup member is inserted into said isolation bush to separate said cup member from said bulkhead plate.

13. The umbilical termination assembly according to claim 3, wherein said outer circumferential surface of said cup member is threaded to allow said cup member to be screwed into position in said bulkhead.

14. The umbilical termination assembly according to claim 3, wherein said bulkhead further comprises a resilient member arranged between said cup member and said bulkhead plate.

15. A method of forming an umbilical termination assembly for an umbilical comprising a plurality of umbilical elements extending from said umbilical, the method comprising:

passing each of said umbilical elements through a respective concave recess in a bulkhead, each recess having a partial spherical inner surface opening on one side of the bulkhead and a smaller opening on an opposite side of the bulkhead;

inserting a ball element into a respective one of said recesses, said ball element having a spherical body portion with an elongate channel passing therethrough, the spherical body portion of each ball element being positioned at least partially into said respective recess; and joining the ball element to the umbilical element.

16. The method according to claim 15, further comprising joining the ball element to the umbilical element by welding.

17. The method according to claim 16, further comprising passing each of said umbilical elements through said respective ball element, prior to joining the ball element to the umbilical element.

18. The method according to claim 15, 16 or 17 wherein the bulkhead includes a bulkhead plate with a hole and said method includes: passing each of said umbilical elements through a cup member having a concave recess, prior to passing each said umbilical element through the seated ball element; and passing the cup member along the umbilical element into said hole in the bulkhead plate, to form said bulkhead.

19. The method according to claim 18, further comprising:

passing each of said umbilical elements through an isolation bush, prior to passing each said umbilical element through the cup member;

inserting said isolation bush into the hole in said bulkhead plate; and inserting the cup member into said isolation bush.

20. The method according to claim 19, wherein said cup member is inserted into said isolation bush by screwing a thread provided on the outer circumference of said cup member into a thread on the inner circumference of said isolation bush.

21. The method according to claim and one of claims 18 to 20 further comprising providing a resilient member between said cup member and said bulkhead plate.

22. The method according to claim 16, further comprising joining an end of each umbilical element to said respective ball element.

* * * * *